United States Patent
Zhou et al.

(10) Patent No.: US 9,300,873 B2
(45) Date of Patent: Mar. 29, 2016

(54) AUTOMATED TRIPOD DETECTION AND HANDLING IN VIDEO STABILIZATION

(75) Inventors: Jianping Zhou, Fremont, CA (US); Sebastien X. Beysserie, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 13/530,500

(22) Filed: Jun. 22, 2012

(65) Prior Publication Data

US 2013/0342714 A1    Dec. 26, 2013

(51) Int. Cl.
*H04N 5/228* (2006.01)
*G03B 39/00* (2006.01)
*H04N 5/232* (2006.01)

(52) U.S. Cl.
CPC ....... *H04N 5/23258* (2013.01); *H04N 5/23267* (2013.01)

(58) Field of Classification Search
CPC .......... H04N 5/23251; H04N 5/23254; H04N 5/23258; H04N 5/23261; H04N 5/23264; H04N 5/23267
USPC ................. 348/208.1–208.13, 208.99, 219.1, 348/220.1; 396/13, 52–55; 359/554–557
See application file for complete search history.

(56) References Cited

U.S. PATENT DOCUMENTS

| 7,546,027 | B2 | 6/2009 | Moriya | |
|---|---|---|---|---|
| 2006/0197866 | A1 | 9/2006 | Fujimoto | |
| 2007/0183765 | A1* | 8/2007 | Imamura | 396/55 |
| 2008/0094479 | A1* | 4/2008 | Yost et al. | 348/208.99 |
| 2010/0134639 | A1* | 6/2010 | Takeuchi | 348/208.4 |
| 2011/0193978 | A1* | 8/2011 | Wu | H04N 5/23248 348/208.6 |
| 2011/0234825 | A1* | 9/2011 | Liu et al. | 348/208.5 |
| 2011/0298937 | A1* | 12/2011 | Ogawa | H04N 5/23258 348/208.4 |
| 2012/0113280 | A1 | 5/2012 | Stupak et al. | |
| 2012/0307086 | A1* | 12/2012 | Jefremov et al. | 348/208.4 |
| 2013/0076921 | A1* | 3/2013 | Owen et al. | 348/208.4 |

* cited by examiner

*Primary Examiner* — Sinh Tran
*Assistant Examiner* — Xi Wang
(74) *Attorney, Agent, or Firm* — Kenyon & Kenyon LLP (57) ABSTRACT

An apparatus, method, and computer-readable medium for motion sensor-based video stabilization. A motion sensor may capture motion data of a video sequence. A controller may compute instantaneous motion of the camera for a current frame of the video sequence. The controller may compare the instantaneous motion to a threshold value representing a still condition and reduce a video stabilization strength parameter for the current frame if the instantaneous motion is less than the threshold value. A video stabilization unit may perform video stabilization on the current frame according to the frame's strength parameter.

16 Claims, 6 Drawing Sheets

AUTOMATED TRIPOD DETECTION AND HANDLING IN VIDEO STABILIZATION

BACKGROUND

The subject matter of this application is directed to video stabilization and, particularly, to detection of whether a camera is in a stationary mode and setting video stabilization parameters based on such detection.

Today, many portable electronic devices are equipped with digital cameras that are capable of capturing video. These devices may perform video stabilization procedures that can compensate for undesired motion introduced into the video. Examples of undesired motion may include motion introduced by a shaking hand holding the camera or undesired motion while walking with the camera. Video stabilization procedures can compensate for the undesired motion of the camera by different image processing techniques.

However, video stabilization is not always necessary. For example, when a camera is not being moved (i.e., stationary), video stabilization techniques may perform image processing that is unnecessary. Such image processing may consume valuable resources of a processor and/or a memory. The camera may be stationary due to being held relatively still or being placed on a stationary surface (e.g., a table or a tripod). Moreover, when video stabilization processes use data from a motion sensor and estimate motion, noise components of the motion sensor while the camera is still can cause video stabilization processes to add jitter to the data rather than remove it.

A user of the camera can manually change the camera settings to disable video stabilization when a camera is stationary. However, manually changing the settings is not always convenient. For example, it would be inconvenient to change the video stabilization settings when the camera is used to capture frames while the camera is moving and frames while the camera is stationary.

Accordingly, the inventors have identified a need in the art for an automatic method to detect whether a camera is in a stationary mode and to sett video stabilization parameters based on such detections. In particular, the inventors have identified a need in the art for a method that detects whether frames of a video are in a stationary mode and adjusts the degree of video stabilization based on whether the frames are in the stationary mode.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

Embodiments of the present invention provide techniques for adjusting the setting of a video stabilizer based on a determination of whether the camera is in a stationary mode. Data from the motion sensor can be used to determine whether the camera is in a stationary mode and the parameters for the video stabilization can be set based on this determination. For example, a controller may compute instantaneous motion of the camera for a current frame of the video sequence. The controller may compare the instantaneous motion to a threshold value representing a still condition and reduce a video stabilization strength parameter for the current frame if the instantaneous motion is less than the threshold value. A video stabilization unit may perform video stabilization on the current frame according to the frame's strength parameter.

Figure 1:
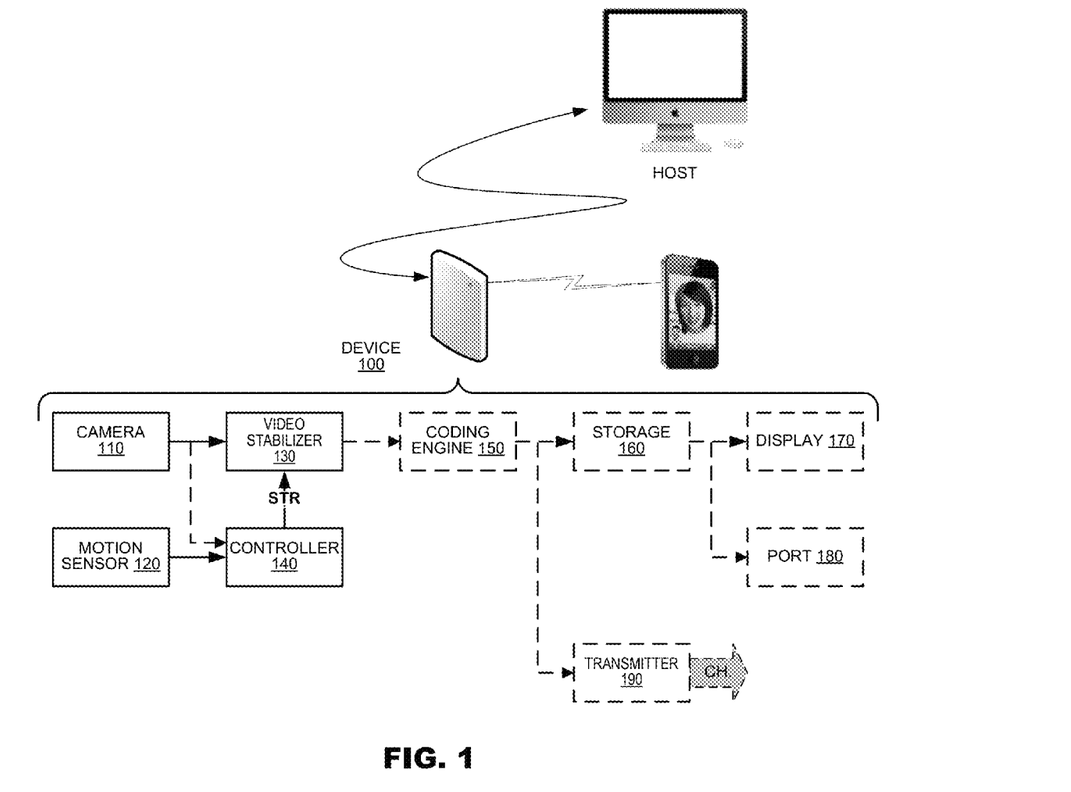
FIG. 1 is a simplified block diagram of a camera-enabled device according to an embodiment of the present invention.

FIG. 1 is a simplified block diagram of a camera-enabled device 100 according to an embodiment of the present invention. The device 100 may include a camera 110, motion sensor 120, video stabilizer 130 and a controller 140. The camera 110 may capture visual information and generate video data therefrom. The motion sensor 120 may detect motion of the device 100 (and, by extension the camera 110) and output motion data to the controller 140. The video stabilizer 130 may perform stabilization techniques on the input video sequence in an attempt to improve the perceptual quality of the video sequence.

For example, the stabilization techniques can attempt to cancel visual artifacts in the video sequence that arise due to unintentional camera motion (e.g., motion introduced by shaky hands). The video stabilizer 130 may operate according to a variety of operational parameters (not shown) provided by the controller 140. For example, the controller 140 may develop a strength parameter STR based on its interpretation of motion data supplied by the motion sensor 120. The value of the strength parameter STR may correspond to the degree of video stabilization to be applied to the video sequence.

For example, a lower strength parameter may be provided when it is determined that little video stabilization needs to be performed and a higher strength parameter may be provided when it is determined that high video stabilization needs to be performed. The controller 140 may also turn off or turn on the video stabilization based on its interpretation of the motion data supplied by the motion sensor 120. The controller 140 may develop a strength parameter for each frame or may develop a strength parameter periodically after a certain number of frames. When multiple motion samples are obtained for each frame, a maximum motion (e.g., rotation angle change) can be used as the motion data for that frame. The strength parameter also may be derived after a certain event (e.g., camera being stationary or camera starts moving) is detected based on the motion data supplied by the motion sensor 120 and/or the image processing of the video sequence.

Optionally, the controller 140 may determine an operational strength for the video stabilizer 130 based on the motion derived from the image data in the input video sequence. The controller 140 may be part of the video stabilizer 130.

The controller 140 may estimate motion of the camera 110 in three dimensions (e.g., pitch/roll/yaw, quaternion units, or x, y, z coordinates).

The motion sensor 120 may output data to the controller 140 representing motion of the camera 110 during each frame. Typically, the motion sensor 120 will output multiple samples of data during each frame. In an embodiment, the motion sensor sampling rate may be 200 Hz. Thus, if the camera outputs video data at 30 frames per second, the motion sensor may generate between 6 and 7 samples of motion data for each frame of video. In other implementations, the motion sampling rate may be between 50 Hz and 200 Hz. In an embodiment, the motion sensor 120 may be an accelerometer, a digital compass, a microelectrical mechanical systems ("MEMS") motion sensor device or a gyroscope. The motion sensor 120 may be mounted within a common housing of the camera 110 or on a common board (not shown) as the camera 110 within the device 100 so that motion of the motion sensor 120 also reflects motion of the camera 110.

The camera 110 may output frames of video to the video stabilizer 130 to perform stabilization techniques on the input video sequence. During operation, the camera 110 may output frames of video of a predetermined size. The video stabilizer 130 may selectively crop image data from the frames in order to compensate for motion detected within the image content. The video stabilizer 130 also may develop a transform to compensate for changes in camera rotation, pitch etc., from frame to frame and may apply these transforms to the corresponding frames. The camera 110 and the motion sensor 120 may operate asynchronously. Video captured by the camera 110 and motion data from the motion sensor 120 may be correlated. A common clock may be used to timestamp both video data and motion data to facilitate the synchronization of asynchronously captured image and motion data by putting them on a common timeline.

In FIG. 1, the device 100 is illustrated as a smartphone, but the principles of the present invention are not so limited. Embodiments of the present invention may be applied in a variety of types of devices, including, for example, portable computers, tablet computers, webcams, digital cameras, and/or camcorders. Accordingly, the camera 110 may include a front facing camera, a rear facing camera or both.

Conventionally, the device 100 may include storage buffers (not shown) between each of the components shown in FIG. 1. For example, the video stabilizer 130 may read video data from a buffer and then write stabilized video data to another buffer. Storage buffers may also be present between components of the coding engine (not shown). These buffers are not illustrated in FIG. 1 for ease of discussion.

Further, the principles of the present invention may be applied in a variety of uses cases. In one use case, video captured by the device 100 may be stored on the device for later playback. Accordingly, FIG. 1 illustrates that the device 100 may include a video coder 150 to compress a video sequence output by the video stabilizer 130 and storage 160 to store the compressed video. In an embodiment, the non-compressed video sequence output by the video stabilizer 130 may be directly stored in storage 160. FIG. 1 also illustrates a display 170 on which the video sequence may be rendered following user selection and decompression if necessary (operations not shown).

In another use case, illustrated in FIG. 1, the video sequence may be uploaded to a host computer. In this case, the device 100 also may employ a video coder 150 and storage 160 to store compressed video until it is uploaded to the host computer via a communication port 180.

In a further use case, also illustrated in FIG. 1, the video sequence may be exchanged with another device as part of real time communication among the devices (ex., a videoconference). In this case, the device 100 may employ a video coder 150 to compress the video sequence and a transmitter 190 to transmit the compressed video to the other device by a wired or wireless communication connection. Although the compressed video typically is buffered prior to transmission, FIG. 1 illustrates the transmitter 190 receiving compressed video directly from the video coder 150 to represent that the video sequence need not be stored persistently by the device 100.

In an embodiment, the controller 140 may determine the strength parameter based on whether the camera is stationary (e.g., in a stationary mode or a tripod mode) or non-stationary (e.g., in a non-stationary mode). The camera may be stationary due to being held relatively still or being placed on a stationary surface (e.g., a table or a tripod). The camera may be determined stationary when there is little or no motion of the camera. Thus, when the motion of the camera is determined to be below a predetermined amount (e.g., stationary mode), the controller 140 may provide a strength parameter that minimizes the degree of video stabilization or disables the video stabilization. However, when the motion of the camera is determined to be above a predetermined amount (e.g., non-stationary mode), the controller 140 may provide a strength parameter that increases the degree of video stabilization, applies a default amount of video stabilization or turns on the video stabilization. When the camera is determined to be non-stationary, the degree of video stabilization that is applied to a frame may be based on the degree of motion between consecutive frames.

Figure 2:
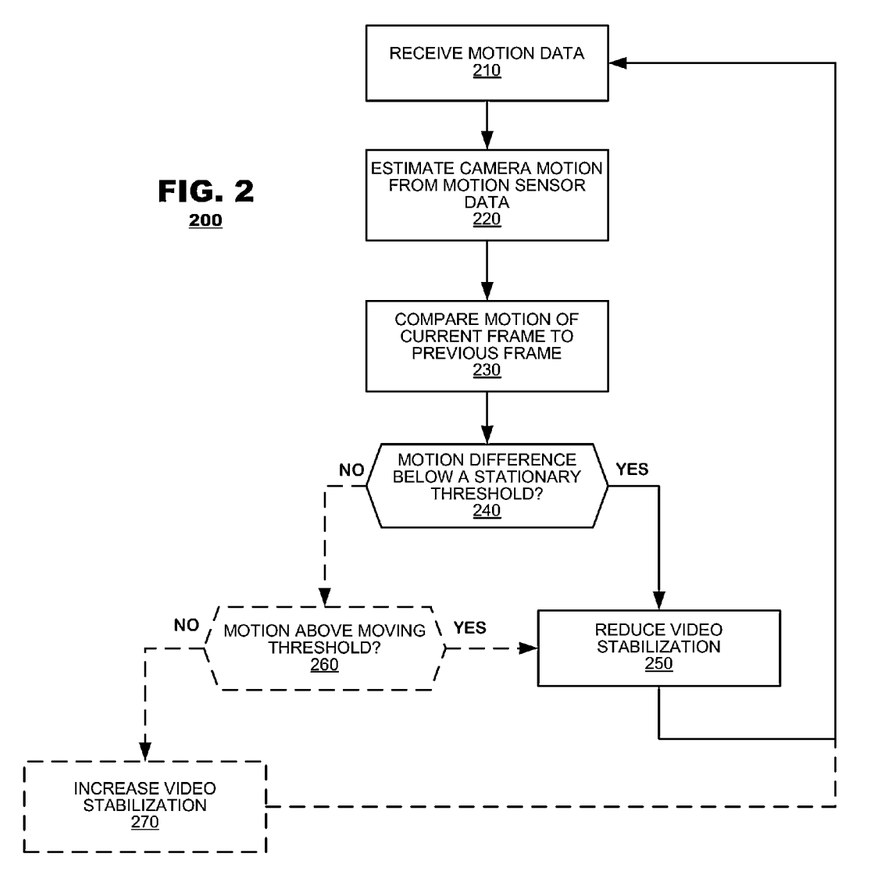
FIG. 2 illustrates a method for determining a video stabilization strength according to an embodiment of the present invention.

FIG. 2 illustrates a method 200 for determining a video stabilization strength according to an embodiment of the present invention. Motion data from the motion sensor 120 can be received by the controller 140 (box 210) and camera motion can be estimated from the motion sensor data (box 220). The estimated camera motion of the current frame can be compared to the camera motion of the previous frame (box 230). If the motion difference between the current frame and the previous frame is below a stationary threshold (box 240) then the video stabilization strength can be reduced (box 250).

The video stabilization strength may be determined by the controller 140. The video stabilization strength may be determined by analyzing the motion data received from motion sensor 120. For a given frame of a video stream, the motion data from the motion sensor 120 can be received by the controller 140 (box 210). The method 200 may be performed for each frame of a video stream, periodically or after occurrence of a certain event (e.g., start of recording video, camera being stationary or camera starts moving).

The motion data from the motion sensor 120 may be analyzed to estimate the camera motion and determine if the camera is in a stationary or in a non-stationary mode (box 220). The analysis of the motion data may include estimating the instantaneous camera motion for the current frame. The analysis may also include estimating the instantaneous camera motion for a previous frame. In one embodiment, the instantaneous camera position may be estimated by feeding the motion data into a lowpass filter. The lowpass filter may be an infinite impulse response (IIR) lowpass filter. The filters may be represented by equation:

$$y[n]=a*y[n-1]+(1-a)*x[n], \qquad (1)$$

where y[n] represents the camera motion for the current frame, y[n−1] represents the camera motion for the previous frame, x[n] represents the motion analysis for the current frame and a is the scaling variable, between 0 and 1, for controlling the contribution of components y[n−1] and x[n] to the camera motion estimation. Scaling variable a can be set to a low value (e.g., 0.05) to determine the instantaneous camera motion.

The motion for the current frame may be compared to the motion of the previous frame to determine a motion between the frames (box 230). The comparison may include comparing the instantaneous motion of the current frame to the instantaneous motion of the previous frame. The comparison may include determining spatial displacement between consecutive frames or may include determining a rotation angle of the camera between the consecutive frames. The motion between the frames may indicate the degree of intentional or unintentional camera movement between the current frame and the previous frame.

The results of the comparison (box 230) may be compared to a stationary threshold value (box 240). If the motion between consecutive frames is below the stationary threshold value, then the current frame can be determined to be in a stationary mode and the degree of video stabilization can be reduced (box 250). However, if the motion between consecutive frames is equal to or above the stationary threshold value, then the current frame can be determined to be in a non-stationary mode and the video stabilization can be maintained at the current setting or a default video stabilization can be applied to the current frame (box 260 and box 270). The reduction of the video stabilization (box 250) may include turning off the video stabilization. In an embodiment, the reduction of the video stabilization (box 250) may be gradual and can increase with each frame if consecutive frames are determined to be in the stationary mode.

The stationary threshold value used to determine whether the camera or the current frame is in a stationary mode may be set based on a type of camera setting (e.g., frame rate or video stabilization settings), a type of camera, a type of motion sensor, or a type of application for which the camera is being used.

Optionally, if it is determined that the motion between consecutive frames is equal to or above the threshold value then the motion between consecutive frames can be used to determine whether video stabilization should be increased or decreased to correct for unintentional camera motion. For example, a determination can be made whether the motion between consecutive frames is above a moving threshold value (box 260). The moving threshold value can be a value that is larger than the stationary threshold value. If the motion between consecutive frames is above the moving threshold value (YES box 260), then the video stabilization can be reduced (box 250). However, if the motion between consecutive frames is equal to or below the moving threshold value (NO box 260), then the video stabilization can be increased (box 270). Other methods can be performed to determine if the video stabilization should be increased or decreased based on the motion between consecutive frames.

Figure 3:
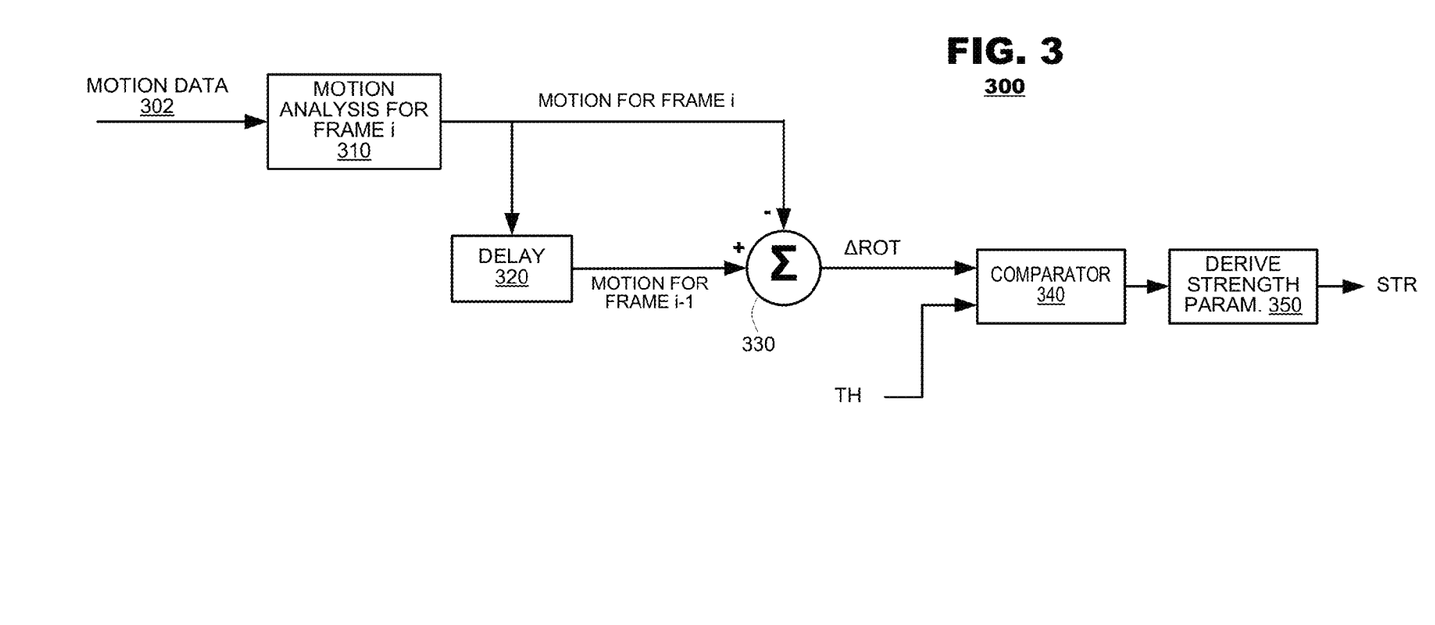
FIG. 3 illustrates a data flow diagram illustrating derivation of a strength parameter according to an embodiment of the present invention.

FIG. 3 illustrates a data flow diagram 300 illustrating derivation of a strength parameter (STR) according to an embodiment of the present invention. The strength parameter STR may be derived by comparing (comparator 340) the difference between the camera motion of the current frame (box 310) and the camera motion of the previous frame (box 320) to a threshold value TH.

As shown in FIG. 3, motion analysis may be performed on motion data 302 received from a motion sensor (not shown). The controller may perform motion analysis (box 310) to determine the movement (e.g., rotation) of the camera for frame i (i.e., current frame) from the motion data 302. The controller may also perform motion analysis (box 320) to determine the motion (e.g., rotation) of the camera for frame i−1 (i.e., previous frame) based on the motion data 302. The motion of the current frame (box 310) may be stored or delayed (box 320) and used as the motion for the previous frame (box 320) at the next frame. The controller may calculate (subtractor 330) a motion difference ΔROT between the camera motion at frame i−1 and the camera motion at frame i. The value of the motion difference ΔROT may represent the camera movement from a previous frame to the current frame. The camera movement may be due to intentional or unintentional camera movement.

The motion difference ΔROT may be compared to a threshold value TH using comparators 340. If the motion difference ΔROT is smaller than the threshold value TH, then the camera can be determined to be in a stationary mode (e.g., tripod mode). Otherwise, the camera can be determined to be in a non-stationary mode (e.g., camera is being moved by the user and video stabilization is needed to correct unintended camera movement). The threshold value TH may be set to a value below which motion difference between consecutive frames would be due to only minimal motion while a camera is on a stationary object such as a tripod. The threshold value TH may also be set or adjusted based on a type of camera setting (e.g., frame rate or stabilization settings), a type of camera, a type of motion sensor, or a type of application for which the camera is being used.

The controller may set a strength parameter based whether the camera is determined to be in a stationary mode or in a non-stationary mode (box 350). In an embodiment, if the camera is determined to be stationary mode (i.e., tripod mode), the controller may set the strength parameter to a small value to provide limited video stabilization. Alternatively, the controller may turn off or disable video stabilization if the camera is determined to be in a stationary mode.

If the motion of the camera is determined to be in a non-stationary mode (e.g., camera is being held by a user) then other techniques can be used to determine the strength parameter for the video stabilization. For example, the controller may adjust the strength parameter based on the degree of detected motion between the consecutive frames.

The controller may calculate strength settings anew for each input frame and may output the strength settings to the video stabilizer for use in processing the input frames. Alternatively, the strength settings may be calculated anew after a predetermined amount of time or after receiving a predetermined number of frames.

The motion data 302 may include motion rate information, the rate at which the camera is being moved in. The motion rate information may include each of 3 axes (x, y, and z). Rate information may be integrated to produce instantaneous position and rotation information (also in each of 3 axes). The rotation information may be quaternion data.

The motion analysis for the current frame (box 310) or the previous frame (box 320) may be calculated by feeding the motion data through one or more lowpass filters to eliminate noise and high frequency components. A lowpass filter may be used to estimate the instantaneous camera position for the current frame. The lowpass filter may be an infinite impulse response (IIR) lowpass filter. In one embodiment, the filter may be represented by equation (1), discussed above with reference to FIG. 2. In equation (1) scaling variable a can be set to a low value (e.g., 0.05) to determine the instantaneous camera position.

Figure 4:
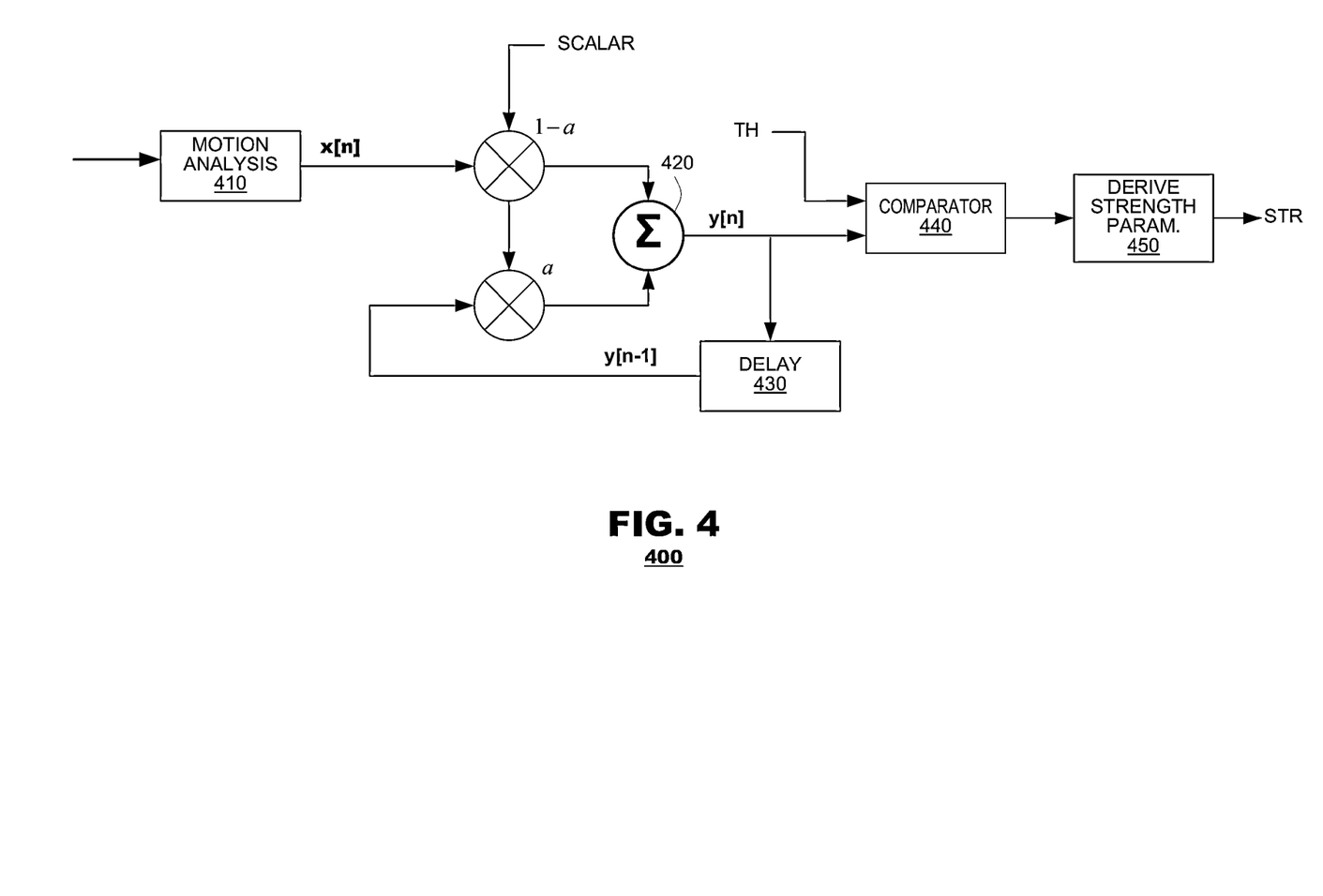
FIG. 4 illustrates a data flow diagram illustrating derivation of a strength parameter using a lowpass filter implementation according to an embodiment of the present invention.

FIG. 4 illustrates a data flow diagram illustrating derivation of a strength parameter STR using a lowpass filter implementation according to an embodiment of the present invention. The derivation of the strength parameter may be performed by the controller 140. The strength parameter may be derived by comparing the instantaneous camera motion to a threshold value. The instantaneous camera motion may be calculated by feeding the motion data through one or more lowpass filters to eliminate noise and high frequency components. The lowpass filter may be an infinite impulse response (IIR) lowpass filter. In one embodiment the filter may be represented by equation (1), discussed above with reference to FIG. 2. In equation (1) scaling variable a can be set to a low value (e.g., 0.05) to determine the instantaneous camera position.

As shown in FIG. 4, motion analysis may be performed on motion data received for the current frame (box 410). The results of the motion analysis $x[n]$ for the current frame may be used to obtain instantaneous camera motion $y[n]$. The instantaneous camera motion $y[n]$ can be obtained by summing (step 420) a first value representing the motion for the current frame and a second value representing the previous instantaneous motion. The contribution of the current frame can be obtained by multiplying the motion analysis $x[n]$ for the current frame by $(1-a)$, where a represents a scaling variable. The contribution of the previous instantaneous motion can be obtained by multiplying the camera position for the previous frame $y[n-1]$ by the scaling variable a. To estimate the instantaneous camera motion the scaling variable SCALAR (i.e. a) is set to a low value (e.g., 0.05). The camera position of the previous frame $y[n-1]$ can be obtained by delaying (box 430) the camera position for the current frame $y[n]$. The initial value of $y[n-1]$ can be set to zero or a predetermined value.

The instantaneous camera motion $y[n]$ can be compared (box 440) to a threshold value TH. If the instantaneous camera motion $y[n]$ is above or equal to the threshold value TH then the camera can be determined as being non-stationary (i.e., not in tripod mode). Otherwise, the camera can be determined as being stationary (i.e., in tripod mode).

A strength parameter STR can be set (box 450) based on the result of comparing the instantaneous camera motion to the threshold value (box 440). The derived strength parameter may be used as an input to the video stabilizer 130 (shown in FIG. 1). The value of the strength parameter STR may be reduced if the camera is determined to be in a stationary mode. The value of the strength parameter STR can be set to a default value or increased if the camera is determined to be in non-stationary mode. The controller may also adjust the strength parameter (box 350) based on the degree of detected motion between the consecutive frames.

Figure 5:
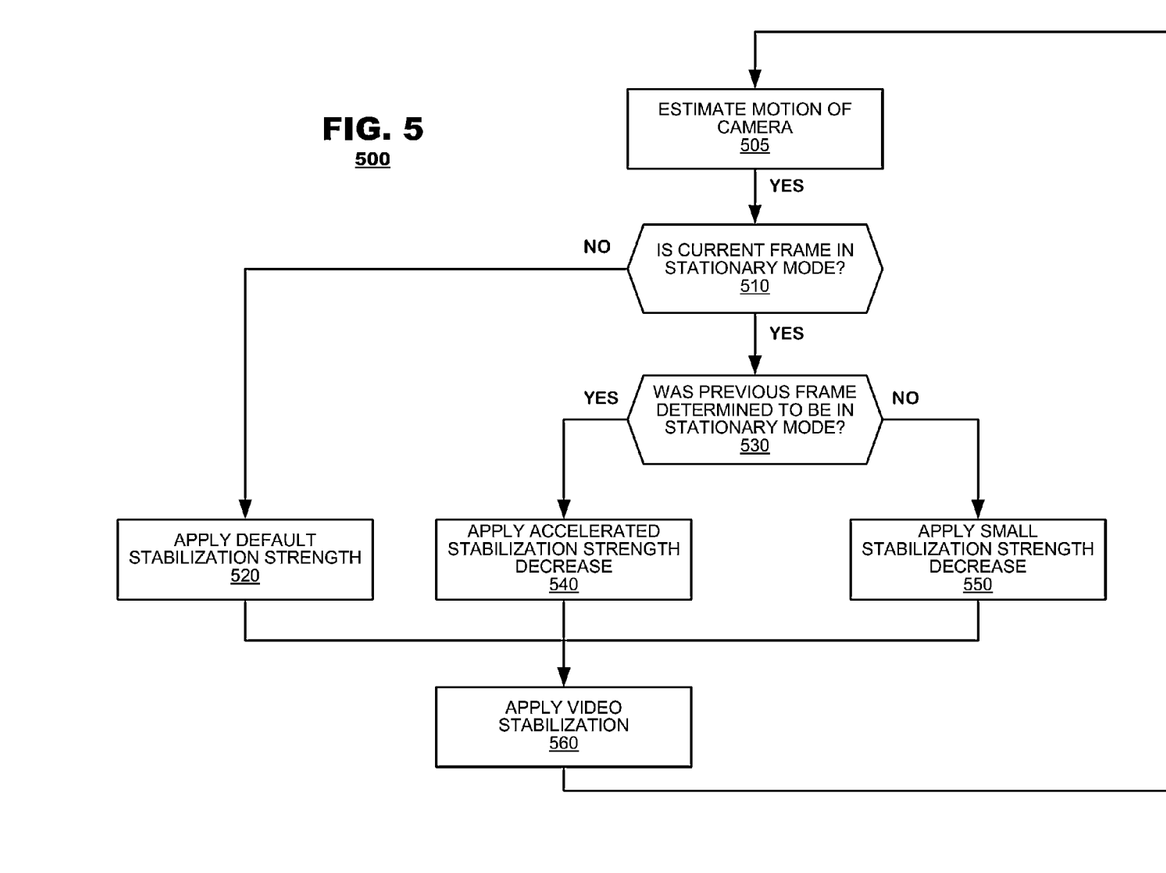
FIG. 5 illustrates a method for setting a video stabilization strength when a frame is determined to be in a stationary mode.

FIG. 5 illustrates a method 500 for setting a video stabilization strength when a frame is determined to be in a stationary mode. As discussed above, when a frame is determined to be in a stationary mode (e.g., tripod mode), the degree of video stabilization may be reduced or disabled. When transitioning between a non-stationary mode and a stationary mode the degree of video stabilization may be gradually increased or decreased. For example, when the camera transitions from a non-stationary mode to a stationary mode, the degree of video stabilization can be decreased by a small value for the first frame and decreased by a greater value for subsequent frames that are in the stationary mode. Thus, the decrease of the video stabilization can be accelerated if consecutive frames are determined to be in the stationary mode. Decreasing the degree of video stabilization by a smaller degree for the first frames in the stationary mode may account for false detection of the stationary mode due to noise that can be present in the motion data received from a motion sensor.

The strength of the video stabilization can be decreased when a frame is determined to be stationary. The motion data associated with one or more frames of a video sequence can be analyzed to estimate the motion of the camera (box 505). The analysis of the motion data can be used to determine if the camera is in a stationary mode (e.g., tripod mode) (box 510). If the current frame is determined to not be in a stationary mode (NO in box 510), then a default video stabilization strength can be applied (box 520). Default video stabilization strength may include setting the video stabilization strength to a predetermined default value or the video stabilization strength may be determined based on the degree of motion in the current frame. The default video stabilization strength may be a value that would correct unintentional camera motion.

If the current frame is determined to be in a stationary mode (YES in box 510), then a determination can be made as to whether the previous frame was in a stationary mode (box 530). The determination as to whether the previous frame or a certain number of previous frames were in a stationary mode (box 530) can be used to determine by what degree to reduce the video stabilization strength. If the previous frame was determined to also be in a stationary mode (YES in box 530), then an accelerated stabilization strength decrease can be applied (box 540). If it is determined that the previous frame was not in a stationary mode (NO in box 530) then a small stabilization strength decrease can be applied (box 550). Video stabilization can be performed based on the set strength parameter (box 560).

The accelerated stabilization strength decrease may be a value that is greater than a value of the small stabilization strength decrease. The value of the accelerated stabilization strength can be increased with each frame that is determined to be in the stationary mode. Thus, with each consecutive frame that is determined to be in the stationary mode, the stabilization strength can be decreased by a value that is larger than the previous value of the decrease. The value of the accelerated stabilization decrease can be increased linearly with each frame that is determined to be in the stationary mode or the value can be increased exponentially with each frame that is determined to be in the stationary mode. If applying the accelerated stabilization strength decrease or the small stabilization strength decrease to the video stabilization strength would cause the stabilization strength value to decrease below a predefined minimum value, then the video stabilization strength can be decreased to the predefined minimum value or kept at the same value.

The value of the accelerated stabilization strength decrease or the small stabilization strength decrease can be reset when it is determined that the current frame is not in a stationary mode. Alternatively, the accelerated stabilization strength decrease or the small stabilization strength decrease can be reset after a predetermined number of frames are determined to be not in a stationary mode.

After a predefined number of consecutive frames are determined to be in a stationary mode (box 530), the video stabilization can be disabled or the video stabilization strength may be decreased to a value (box 540) that turns off the video stabilization.

In a further embodiment, once it is determined that the current frame or the camera is in a stationary mode by analyzing the motion data from the motion sensor, a secondary analysis can be performed on the frames of the video sequence to confirm that the camera is in a stationary mode. Image processing techniques can be performed on the frames of the video sequence to estimate the motion of the camera and determine whether the camera is stationary. Because the secondary analysis is performed only when a determination is made that the camera is in a stationary mode, the secondary analysis does not have to be performed on every frame of the video sequence.

The secondary analysis may include estimating the motion of pixels in consecutive frames and comparing the motion of pixels in the consecutive frames to the motion determined from the motion data supplied by the motion sensor. The secondary analysis may include estimating the motion vector using the motion data from the sensor and determining whether the motion of pixels in the consecutive frames correspond to the estimated motion vector. If the difference between the motion estimated by the motion data from the sensor and the motion of pixels in consecutive frames is within a predetermined limit, then the current frame or the camera can be determined to be stationary. The secondary analysis can be performed on a predetermined number of frames and/or on a predetermined number of pixels in the frame.

Figure 6:
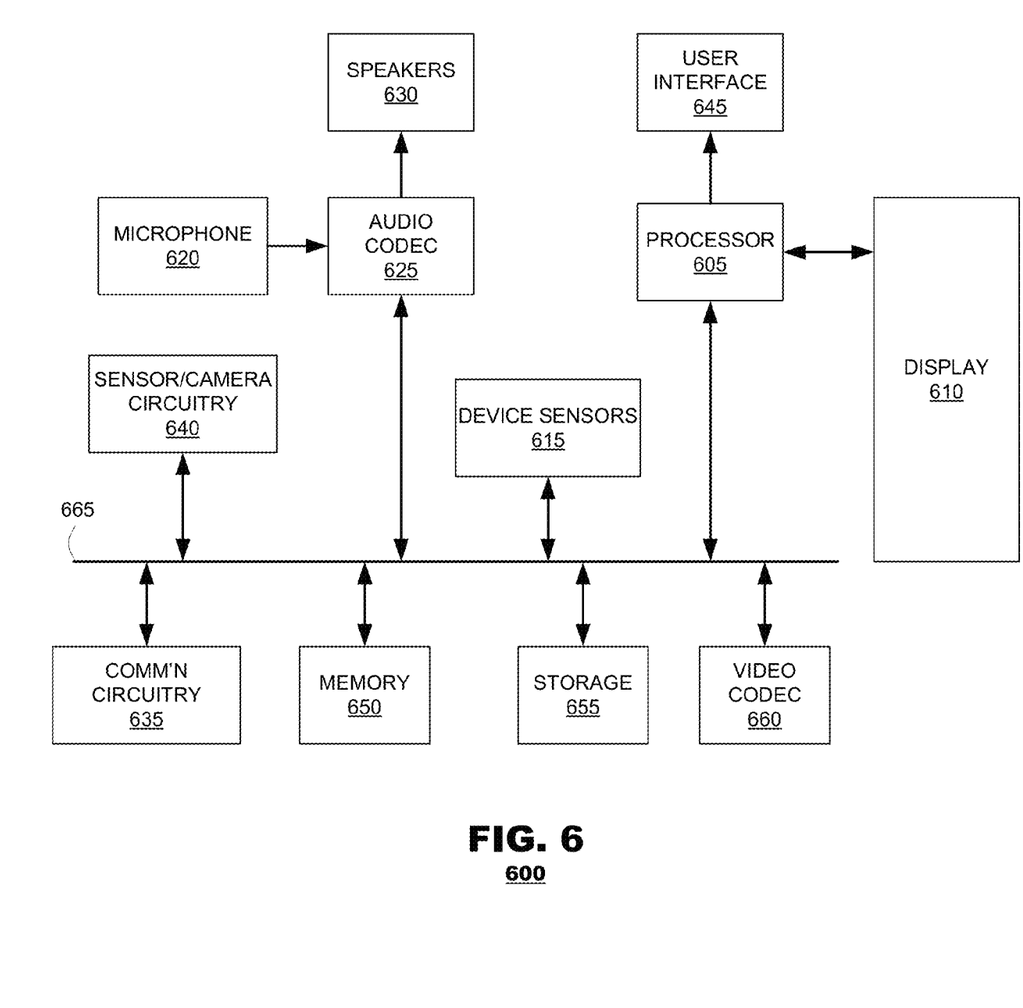
FIG. 6 is a simplified functional block diagram of a representative electronic device incorporating digital video capture capability according to one embodiment.

FIG. 6 is a simplified functional block diagram of representative electronic device 600 incorporating digital video capture capability is shown according to one embodiment. Electronic device 600 may include processor 605, display 610, device sensors 615 (e.g., gyro, accelerometer, proximity, and ambient light sensors), microphone 620, audio codec 625, speaker 630, communications circuitry 635, image sensor with associated camera and video hardware 640, user interface 645, memory 650, storage device 655, video codec (s) 660 and communications bus 665.

Processor 605 may be any suitable programmable control device or general or special purpose processor or integrated circuit and may execute instructions necessary to carry out or control the operation of many functions, such as the generation and/or processing of image metadata, as well as other functions performed by electronic device 600. Processor 605 may for instance drive display 610 and may receive user input from user interface 645. Processor 605 also may be, for example, a system-on-chip such as an application's processor such as those found in mobile devices or a dedicated graphics processing unit (GPU). Processor 605 may be based on reduced instruction-set computer (RISC) or complex instruction-set computer (CISC) architectures or any other suitable architecture and may include one or more processing cores.

Memory 650 may include one or more different types of storage media used by processor 605 to perform device functions. Memory 650 may include, for example, cache, read-only memory (ROM), and/or random access memory (RAM). Communications bus 660 may provide a data transfer path for transferring data to, from, or between at least storage device 655, memory 650, processor 605, and camera circuitry 640. User interface 645 may allow a user to interact with electronic device 600. For example, user interface 645 can take a variety of forms, such as a button, keypad, dial, a click wheel, or a touch screen.

Non-transitory storage device 655 may store media (e.g., image and video files), computer program instructions or software, preference information, device profile information, and any other suitable data. Storage device 655 may include one more storage mediums including, for example, magnetic disks (fixed, floppy, and removable) and tape, optical media such as CD-ROMs and digital video disks (DVDs), and semiconductor memory devices such as Electrically Programmable Read Only Memory (EPROM), and Electrically Erasable Programmable Read-Only Memory (EEPROM).

Video codec 660 may be a hardware device, a software module or a combination of hardware and software that enables video compression and/or decompression of digital video. For example, video codec 660 may implement the H.264 video standard. Communications bus 665 may be any one or more communication paths and employ any technology or combination thereof that is appropriate for the particular implementation.

Software may be organized into one or more modules and be written in any suitable computer programming language (or more than one language). When executed by, for example, processor 605 such computer program code or software may implement one or more of the methods described herein.

Various changes in the materials, components, circuit elements, as well as in the details of the illustrated operational methods are possible without departing from the scope of the following claims. For instance, processor 605 may be implemented using two or more program control devices communicatively coupled. Each program control device may include the above-cited processors, special purpose processors or custom designed state machines that may be embodied in a hardware device such as an application specific integrated circuit (ASIC) or a field programmable gate array (FPGA). In addition, the techniques disclosed herein may be applied to previously captured video sequences, providing the necessary metadata has been captured for each video frame.

In the above description, for purposes of explanation, numerous specific details have been set forth in order to provide a thorough understanding of the inventive concepts. As part of this description, some structures and devices may have been shown in block diagram form in order to avoid obscuring the invention. Reference in the specification to "one embodiment" or "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Although the methods illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture and processing field having the benefit of this disclosure.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

We claim:

1. A video stabilization method, comprising:
   obtaining motion data from a motion sensor different from an imaging sensor corresponding to motion of a camera;
   estimating from the motion data and previous motion data from the motion sensor, instantaneous motion of a camera for a current frame of a video sequence;
   comparing the instantaneous motion to a threshold value representing a relatively still condition;
   reducing a video stabilization strength parameter for the current frame if the instantaneous motion is less than the threshold value, the video stabilization strength parameter defining an overall degree of video stabilization to be performed for the current frame,
   wherein the video stabilization strength parameter is decreased by a first value if the instantaneous motion of the current frame is below the threshold value and the instantaneous motion of a preceding frame is equal to or above the threshold value,
   the video stabilization strength parameter is decreased by a second value if the instantaneous motion of the current frame and the previous frame are below the threshold value, and wherein the first value is smaller than the second value;
   and performing video stabilization on the current frame according to the frame's video stabilization strength parameter.

2. The method of claim 1, wherein the instantaneous motion of the camera corresponds to a motion difference between the current frame and a previous frame.

3. The method of claim 1, wherein estimating the instantaneous motion of the camera includes determining a difference between instantaneous motion for the current frame and instantaneous motion of a frame preceding the current frame.

4. The method of claim 1, wherein if the instantaneous motion is less than the threshold value, pixels in one or more frames of the video sequence are processed to determine motion in the current frame.

5. The method of claim 1, wherein the motion data is derived from gyroscopic sensor data.

6. The method of claim 1, wherein computing the instantaneous motion includes filtering the motion data.

7. The method of claim 1, wherein the motion data is derived from accelerometer sensor data.

8. The method of claim 1, wherein the motion data is rotational data.

9. The method of claim 1, wherein the camera is a portable electronic device.

10. A non-transitory computer-readable medium embodied with computer-executable instructions for causing a computer to execute instructions, the computer instructions comprising:
    obtaining motion data from a motion sensor different from an imaging sensor corresponding to motion of a camera;
    estimating from the motion data and previous motion data from the motion sensor, instantaneous motion of a camera for a current frame of a video sequence;
    comparing the instantaneous motion to a threshold value representing a relatively still condition; reducing a video stabilization strength parameter for the current frame if the instantaneous motion is less than the threshold value, the video stabilization strength parameter defining an overall degree of video stabilization to be performed for the current frame,
    wherein the video stabilization strength parameter is decreased by a first value if the instantaneous motion of the current frame is below the threshold value and the instantaneous motion of a preceding frame is equal to or above the threshold value,
    the video stabilization strength parameter is decreased by a second value if the instantaneous motion of the current frame and the previous frame are below the threshold value, and
    the first value is smaller than the second value;
    and performing video stabilization on the current frame according to the frame's video stabilization strength parameter.

11. The non-transitory computer-readable medium of claim 10, wherein the instantaneous motion of the camera corresponds to a motion difference between the current frame and a previous frame.

12. The non-transitory computer-readable medium of claim 10, wherein estimating the instantaneous motion of the camera includes determining a difference between instantaneous motion for the current frame and instantaneous motion of a frame preceding the current frame.

13. The non-transitory computer-readable medium of claim 10, wherein the motion data is derived from gyroscopic sensor data.

14. A method comprising:
    determining whether a current frame of a video sequence is in a stationary mode based on motion data associated with the current frame, wherein the motion data are obtained from a motion sensor different from an image sensor;
    determining whether a frame preceding the current frame was determined to be in the stationary mode based on motion data associated with the frame preceding the current frame;
    decreasing the video stabilization strength parameter by a first value if it is determined that the current frame is in the stationary mode and the frame preceding the current frame is not in the stationary mode;
    decreasing the video stabilization strength parameter by a second value if it is determined that the current frame is in the stationary mode and the frame preceding the current frame is in the stationary mode, wherein the first value is smaller than the second value; and
    performing video stabilization on the current frame according to the frame's video stabilization strength parameter.

15. The method of claim 14, wherein the video stabilization strength parameter is decreased by a greater value with each consecutive frame that is determined to be in the stationary mode.

16. An apparatus comprising:
    a camera to capture a video sequence;
    a motion sensor different from an image sensor to capture motion data associated with the video sequence;
    a controller to: compute, from the motion data and previous motion data from the motion sensor, instantaneous motion of the camera for a current frame of the video sequence,
    compare the instantaneous motion to a threshold value representing a relatively still condition, and
    reduce a video stabilization strength parameter for the current frame if the instantaneous motion is less than the threshold value, the video stabilization strength parameter defining an overall degree of video stabilization to be performed for the current frame, wherein the video stabilization strength parameter is decreased by a first value if the instantaneous motion of the current frame is below the threshold value and the instantaneous motion of a preceding frame is equal to or above the threshold value, the video stabilization strength parameter is decreased by a second value if the instantaneous motion of the current frame and the previous frame are below the threshold value, and the first value is smaller than the second value;

and a video stabilization unit to perform video stabilization on the current frame according to the frame's strength parameter.

\* \* \* \* \*